(12) United States Patent
Huston, III

(10) Patent No.: US 11,622,024 B2
(45) Date of Patent: Apr. 4, 2023

(54) CLOUD-BASED EXPLICIT PROXY

(71) Applicant: Forcepoint LLC, Austin, TX (US)

(72) Inventor: Lawrence B. Huston, III, Austin, TX (US)

(73) Assignee: FORCEPOINT LLC, Austin, TX (US)

( * ) Notice: Subject to any disclaimer, the term of this patent is extended or adjusted under 35 U.S.C. 154(b) by 0 days.

(21) Appl. No.: 17/033,083

(22) Filed: Sep. 25, 2020

(65) Prior Publication Data

US 2022/0103647 A1    Mar. 31, 2022

(51) Int. Cl.
*H04L 67/56* (2022.01)
*H04L 9/40* (2022.01)

(52) U.S. Cl.
CPC .......... *H04L 67/56* (2022.05); *H04L 63/0281* (2013.01)

(58) Field of Classification Search
CPC ............................ H04L 63/0281; H04L 67/28
See application file for complete search history.

(56) References Cited

U.S. PATENT DOCUMENTS

| | | | |
|---|---|---|---|
| 7,698,416 B2 | 4/2010 | Potti et al. | |
| 8,090,839 B2 | 1/2012 | Kumar et al. | |
| 8,473,620 B2 | 6/2013 | Demmer et al. | |
| 8,799,403 B2 | 8/2014 | Chan et al. | |
| 8,938,553 B2 | 1/2015 | Ly et al. | |
| 9,065,800 B2 | 6/2015 | Devarajan et al. | |
| 9,531,758 B2 | 12/2016 | Devarajan et al. | |
| 10,425,507 B2 | 9/2019 | Ponec et al. | |
| 2016/0088049 A1 | 3/2016 | Seed et al. | |
| 2017/0150508 A1* | 5/2017 | Swanson | H04W 28/0247 |
| 2018/0046487 A1* | 2/2018 | Matters | G06F 9/45558 |
| 2018/0227390 A1 | 8/2018 | Reznik et al. | |
| 2019/0020723 A1* | 1/2019 | Kumar | H04L 67/28 |

* cited by examiner

*Primary Examiner* — Gil H. Lee
(74) *Attorney, Agent, or Firm* — Jackson Walker LLP; Christopher J. Rourk

(57) ABSTRACT

A system for processing data, comprising a first processor configured to operate one or more algorithms to provide an explicit proxy that directs network communications over a public network to a proxy server. The first processor configured to operate one or more algorithms to provide a firewall agent that verifies the presence of a firewall key prior to allowing data communications over the public network using the explicit proxy. Wherein the explicit proxy is installed using a proxy auto configuration file that is associated with the firewall agent.

20 Claims, 2 Drawing Sheets

CLOUD-BASED EXPLICIT PROXY

TECHNICAL FIELD

The present disclosure relates generally to firewall systems, and more specifically to a system and method for a cloud-based explicit proxy for providing firewall services to users.

BACKGROUND OF THE INVENTION

A firewall typically requires a user to be on a protected network, and firewall services for public network-connected users must typically be local.

SUMMARY OF THE INVENTION

A system for processing data is provided that includes a first processor that is configured to operate one or more algorithms to provide an explicit proxy that directs network communications over a public network to a proxy server. The first processor is also configured to operate one or more algorithms to provide a firewall agent that verifies the presence of a firewall key prior to allowing data communications over the public network using the explicit proxy. The explicit proxy is installed using a proxy auto configuration file that is associated with the firewall agent.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
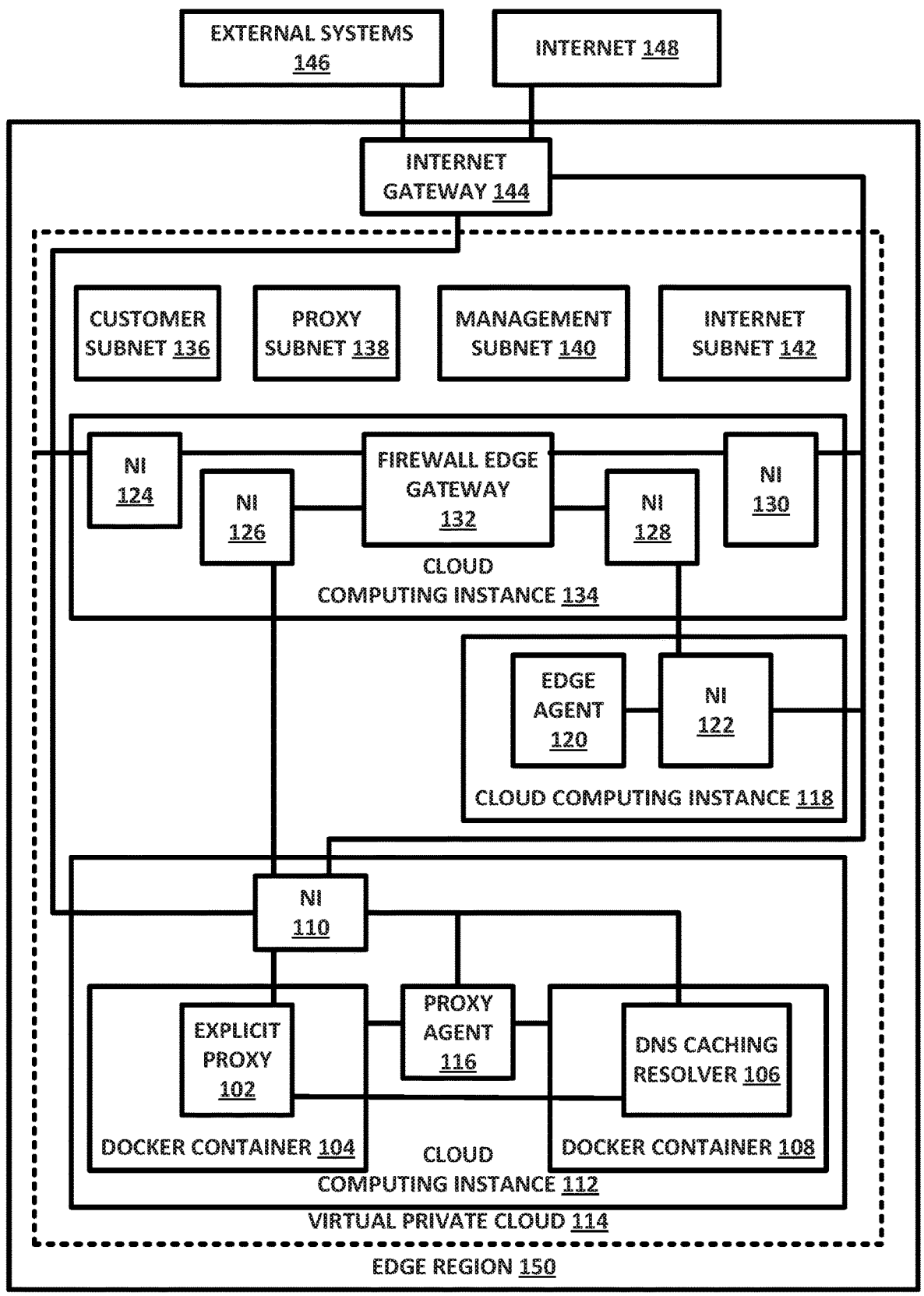
FIG. 1 is a diagram of a system for providing a cloud-based explicit proxy for firewall services, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

As more computer services transition to a cloud-based platform, where the servers that support an individual user are dynamically assigned and instantiated, providing edge protection is more difficult to accomplish. Unless the edge protection is provided by the cloud services provider, it cannot be implemented using a physical device that isolates the user's network from the public network. Even if firewall services are provided by the cloud computing service, the consumer of the cloud computing service must accept the firewall service offering and may have limited control over those firewall services.

The present disclosure provides a Dynamic Edge Protection (DEP) cloud based platform that enables the protection of a user's end point device, which can be connected to a public network at any suitable location, such as to allow a roaming user to receive firewall protected data traffic, and not just those end point devices that are based at a protected static location, such as on a protected network at a company headquarters that is protected by a physical firewall.

To provide the disclosed features, a DEP explicit proxy and DNS cache resolver are disclosed that are configured to work in coordination with the existing firewall services that may already be in use at a protected network. For an explicit proxy deployment, a client computer is configured to use a specific proxy server, such as by changing the web browser client and by accordingly configuring the proxy server.

A proxy server that operates in a cloud-based implementation, such as one that runs on Amazon Web Services (AWS) or other suitable cloud hosted systems, can be used to enable an end point device to send network traffic to the explicit proxy, such as by using a proxy auto-configuration (PAC) file or in other suitable manners. A PAC file can be configured to identify a host name that is specific to an enterprise, such as mycompany.proxy.firewallprovider.com:8080, so that the explicit proxy will forward traffic to the firewall provider, such as a next generation firewall (NGFW) or other suitable firewall systems.

The explicit proxy can be written in the programming language Golang or other suitable programming languages, and can be hosted within a suitable software container, such as a versioned Docker container or other suitable containers, a virtual machine, on a server or in other suitable manners. The container can then be stored in a suitable registry, such as the AWS Elastic Container Registry (ECR) or other suitable registries. The container can also be built and pushed to the ECR or other suitable registry using a Jenkins pipeline or in other suitable manners.

The DNS cache resolver can include a temporary database of recent queries to the explicit proxy, to provide a faster response to a DNS query. The DNS cache resolver can also be hosted within a container, such as a Docker container or other suitable container, and can be pushed to registry using shared Jenkins pipeline code or in other suitable manners. In one example embodiment, the same Docker pipeline code can be used for provisioning the explicit proxy Docker container as well as the DNS cache resolver.

The explicit proxy Docker container, virtual machine, server or other suitable component can be stored in a registrar such as the ECR, to be readily available for provisioning for a new user of DEP or in other suitable manners. In one example embodiment, a versioned explicit proxy Docker container can be stored and provisioned multiple times, depending on specific end-user requirements, or other suitable systems or components can also or alternatively be used. One versioned explicit proxy Docker container can be stored and provisioned multiple times, depending on specific end-user requirements.

The explicit proxy and DNS cache resolver docker containers can be executed using a suitable cloud computing platform, such as an AWS Elastic Compute Cloud (EC2) instance or in other suitable manners. The explicit proxy and DNS cache resolver docker containers can be further configured to operate in conjunction with a next generation firewall instance that operates on the same cloud computing platform, within a virtual private cloud such as an AWS Virtual Private Cloud (VPC), or in other suitable manners.

The PAC file can be generated by a DEP PAC file service or in other suitable manners. A PAC file download URL can be made available through a DEP customer portal user interface, such as when a customer is "on boarded" or configured to use the DEP services.

Once the PAC file is downloaded via the download URL or in other suitable manners to an end point device, it can be determined whether the end point device is also running firewall system end point device software, such as an agent or thin client, and whether it has a valid security key that is used to authenticate the end point device with the explicit proxy. For example, the security key can be a key that is used by a firewall system to validate a user (a firewall key), a key that is used by an access control system to validate a user (an access key) or other suitable keys. If the end point device satisfies the security requirements, it is configured and allowed to send data traffic to a cloud hosted explicit proxy server. The cloud hosted explicit proxy server can be instantiated for the end point device, and can forward the data traffic to a cloud hosted DEP firewall, such as a next generation firewall (NGFW) or other suitable systems.

A roaming user with an end point device that is authorized to interconnect with the cloud processor firewall system can download and install the PAC file, after which it can send traffic to the cloud-based explicit proxy and firewall.

The explicit proxy can be configured to send User Principal Name (UPN) traffic to the firewall, to enable the firewall service provider to generate data traffic reports that include the user identity. This feature can be used to provide dynamic user protection features and user-based policy features.

In another embodiment, a Jenkins Pipeline (Pipeline as Code) can be used to build, version and store an AWS ECR, in order to make the explicit proxy available to be provisioned as needed for a customer. In this manner, the explicit proxy can be used with a cloud-based firewall service or other backend services hosted on a cloud-based processing platform.

An explicit proxy agent can be provided using Python or in other suitable manners. The explicit proxy agent can be configured to use suitable operating commands, such as AWS System Manager (SSM) commands, to cause the Docker containers to be pulled from AWS ECR and provisioned on the explicit proxy cloud computing instance. The explicit proxy can then start the services using an automated process which is run during the on-boarding of a DEP customer.

Container-based services can then be provisioned, such as Docker hosted services, on the cloud computing instance. This provisioning can also be implemented using an automated process. A DNS hostname can then be generated and stored in the cloud processing platform DNS, such as the AWS Route 53 service or other suitable services. The host name can be assigned the IP address of the explicit proxy instance.

A failover firewall and explicit proxy can be provisioned using the cloud DNS routing policies. In this manner, if an explicit proxy is unresponsive, an end point device can automatically send traffic to an explicit proxy provisioned in a different cloud platform region. This process can be achieved by having a duplicate DNS host-name assigned the IP address of the failover explicit proxy.

The hostname can be written to the PAC file using an automated PAC file service or in other suitable manners. The PAC file download URL can then be made available to users through a DEP customer portal after they have logged onto the system. The orchestration of the explicit proxy feature with other cloud features increases the strength of protection.

In another example embodiment, Docker containers can be run as services on an AWS EC2 instance, which can run as an Explicit Proxy and can be encrypted with a Forcepoint PCEP Key, which can be a firewall key or other suitable keys. A DNS Cache Resolver can be provisioned in compliance with a Forcepoint NGFW (multi-region, multi-NGFW EProxy provisioning) using Python EProxy Agents. The provisioning of Route 53 DNS records can allow for traffic to be sent to an EProxy Instance (cater for fail-over) and the PAC file generation per customer, having had this achieved via an automated process ran in AWS (an AWS State Machine/Step Function). Likewise, other suitable embodiments and variations can also or alternatively be used.

FIG. 1 is a diagram of a system 100 for providing a cloud-based explicit proxy for firewall services, in accordance with an example embodiment of the present disclosure. System 100 includes explicit proxy 102, docker container 104, DNS caching resolver 106, docker container 108, network interface 110, cloud computing instance 112, virtual private cloud 114, proxy agent 116, cloud computing instance 118, edge agent 120, network interfaces 122-130, firewall edge gateway 132, cloud computing instance 134, customer subnet 136, proxy subnet 138, management subnet 140, Internet subnet 142, Internet gateway 144, external systems 146, Internet 148 and edge region 150, each of which can be implemented in hardware or a suitable combination of hardware and software.

Explicit proxy 102 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use explicit proxy 102 to obtain firewall services that would otherwise need to be provided from the user device or from a server that controls access to a public network such as the Internet for the user device. Explicit proxy 102 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes.

Docker container 104 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use docker container 104 to obtain firewall services that would otherwise need to be provided from the user device or from a server that controls access to a public network such as the Internet for the user device. Docker container 104 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes.

DNS caching resolver 106 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use DNS caching resolver 106 to obtain firewall services that would otherwise need to be provided from the user device or from a server that controls access to a public network such as the Internet for the user device. DNS caching resolver 106 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality as discussed further herein, or for other suitable purposes. DNS caching resolver 106 is configured to receive and process a DNS query from explicit proxy 102, and to interact with network interface 110.

Docker container 108 is configured in a manner similar to docker container 104, and is further configured to support DNS caching resolver 106, as discussed further herein, as well as other suitable functions.

Network interface 110 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use network interface 110 to obtain firewall services that would otherwise need to be provided from the user device or from a server that controls access to a public network such as the Internet for the user device. Network interface 110 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Network interface 110 is configured to receive and process proxy data messages from Internet gateway 144, data messages with a firewall header from network interface 126, configuration data messages from network interface 122 and Internet gateway 144, logs, health monitoring and DNS query data messages from Internet gateway 144, explicit proxy data messages from explicit proxy 102 and DNS caching resolver data messages from DNS caching resolver 106, as discussed further herein, as well as to provide other suitable functions.

Cloud computing instance 112 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 112 to obtain firewall services that would otherwise need to be provided from the user device or from a server that controls access to a public network such as the Internet for the user device. Cloud computing instance 112 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 112 is configured to host explicit proxy 102, docker container 104, DNS caching resolver 106, docker container 108, network interface 110 and proxy agent 116, including associated data processing, memory and messaging, as discussed further herein, as well as other to provide suitable functions.

Virtual private cloud 114 be implemented as one or more algorithms that operate in conjunction with a processor and associated memory devices to cause the processor to perform functions associated with supporting public network access through a firewall for a device that is coupled to a public network, as discussed further herein, as well as other suitable processes supported by a virtual private cloud, such as data processing, messaging and data storage. In one example embodiment, a user device can access a virtual enterprise network, such as edge region 150 or other suitable enterprise networks, and can use virtual private cloud 114 to obtain firewall services that would otherwise need to be provided from the user device or from a server that controls access to a public network such as the Internet for the user device. Virtual private cloud 114 one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Virtual private cloud 114 is configured to support cloud computing instances 110, 118 and 134 and their associated components, as well as customer subnet 136, proxy subnet 138, management subnet 140 and Internet subnet 142, as discussed further herein, as well as to provide other suitable functions.

Proxy agent 116 be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use proxy agent 116 to obtain firewall services that would otherwise need to be provided from the user device or from a server that controls access to a public network such as the Internet for the user device. Proxy agent 116 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Proxy agent 116 is configured to receive and process proxy data messages from docker container 104, docker container 108 and network interface 110, as discussed further herein, as well as to provide other suitable functions.

Cloud computing instance 118 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 118 to obtain firewall services that would otherwise need to be provided from the user device or from a server that controls access to a public network such as the Internet for the user device. Cloud computing instance 118 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 118 is configured to host edge agent 120 and network interface 122, including associated data processing, memory and messaging, as discussed further herein, as well as other to provide suitable functions.

Edge agent 120 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use edge agent 120 to obtain firewall services that would otherwise need to be provided from the user device or from a server that controls access to a public network such as the Internet for the user device. Edge agent 120 is one component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Edge agent 120 is configured to use network interface 122 to provide edge gateway configuration data to network interface 128, as discussed further herein, as well as other to provide suitable functions.

Network interfaces 122-130 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use network interfaces 122-130 to obtain firewall services that would otherwise need to be provided from the user device or from a server that controls access to a public network such as the Internet for the user device. Network interfaces 122-130 are components of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Network interfaces 122-130 are configured to provide tunnel data traffic to firewall edge gateway 132, to provide traffic with a firewall header to firewall edge gateway 132, to provide edge gateway configuration data to firewall edge gateway 132 and to provide logs/health monitoring and DNS queries to Internet gateway 144, as discussed further herein, as well as other to provide suitable functions.

Firewall edge gateway 132 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use firewall edge gateway 132 to obtain firewall services that would otherwise need to be provided from the user device or from a server that controls access to a public network such as the Internet for the user device. Firewall edge gateway 132 is a component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Firewall edge gateway 132 is configured to receive tunnel data traffic from network interface 124, to receive traffic with a firewall header from network interface 126, to receive edge gateway configuration data from network interface 128 and to provide logs/health monitoring and DNS queries to network interface 130, as discussed further herein, as well as other to provide suitable functions.

Cloud computing instance 134 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and can use cloud computing instance 134 to obtain firewall services that would otherwise need to be provided from the user device or from a server that controls access to a public network such as the Internet for the user device. Cloud computing instance 134 is a component of a system that works in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes. Cloud computing instance 134 is configured to host network interfaces 124-130 and edge gateway 132, including associated data processing, memory and messaging, as discussed further herein, as well as other to provide suitable functions.

Customer subnet 136, proxy subnet 138, management subnet 140 and Internet subnet 142 can be implemented as one or more algorithms that operate in conjunction with a processor and associated memory devices to cause the processor to perform functions associated with supporting public network access through a firewall for a device that is coupled to a public network, as discussed further herein. In one example embodiment, a user device can access a virtual enterprise network, such as edge region 150 or other suitable enterprise networks, and customer subnet 136, proxy subnet 138, management subnet 140 and Internet subnet 142 can be used to support and provide firewall services that would otherwise need to be supported and provided from the user device or from a server that controls access to a public network, such as the Internet for the user device. Customer subnet 136, proxy subnet 138, management subnet 140 and Internet subnet 142 are components of a system that work in synchrony to support firewall functionality for a user device that has access to a public network, but that does not require the user device to have the firewall functionality locally installed. In this manner, the firewall functionality for the user device can be modified or selected based on parameters associated with the user, global requirements for all users, to correct bugs, to provide additional functionality, or for other suitable purposes.

Internet gateway 144, external systems 146 and Internet 148 provide access to a public network and public network functions, such as to allow unregulated entities to provide data and services to users. Because many of these data and services are provided by unregulated entities, they can be used to launch malicious attacks on the user devices, the network components and other systems and devices. In addition, end point devices are included in the external systems 146, and access the components of system 100 behind Internet gateway 144 using a PAC file that can be obtained from a PAC file service, or in other suitable manners. As discussed further herein, the PAC file can be generated by a DEP PAC file service and a PAC file download URL can be made available using a DEP customer portal user interface, such as when a customer is "on boarded" onto the DEP service, as discussed further herein, or other suitable processes can also or alternatively be used. The PAC file is run on the end point device, such as by downloading the PAC file to the end point device by executing the PAC file download URL or in other suitable manners. When the PAC file is executed, it configures the end point device, such as by defining how web browsers and other user agents can automatically choose the appropriate proxy server for fetching a given URL. The PAC file can contain a suitable JavaScript function, such as FindProxy-ForURL, that returns a string with one or more access method specifications. In addition, a firewall system agent can be implemented on the end point, and can include one or more security devices such as a security key that are used to ensure that the end point and the user of the end point are authorized users. In this manner, the use of the explicit proxy by the end point can be coordinated with the firewall system, and the end point device can be prevented from accessing systems over the public network unless the access is controlled by the firewall.

In operation, system 100 allows a user device that is coupled to a public network such as the Internet to be protected, by providing an integrated suite of docker containers, explicit proxies and other suitable system components that prevent the user device from accessing the public network directly, and which ensure that public network data traffic is protected by a firewall system that can be modified and adapted to provide new or different functionality without the need to install new functionality on the user device. In this manner, secure firewall protection can be provided even when a user device is not physically connected to a protected network.

Figure 2:
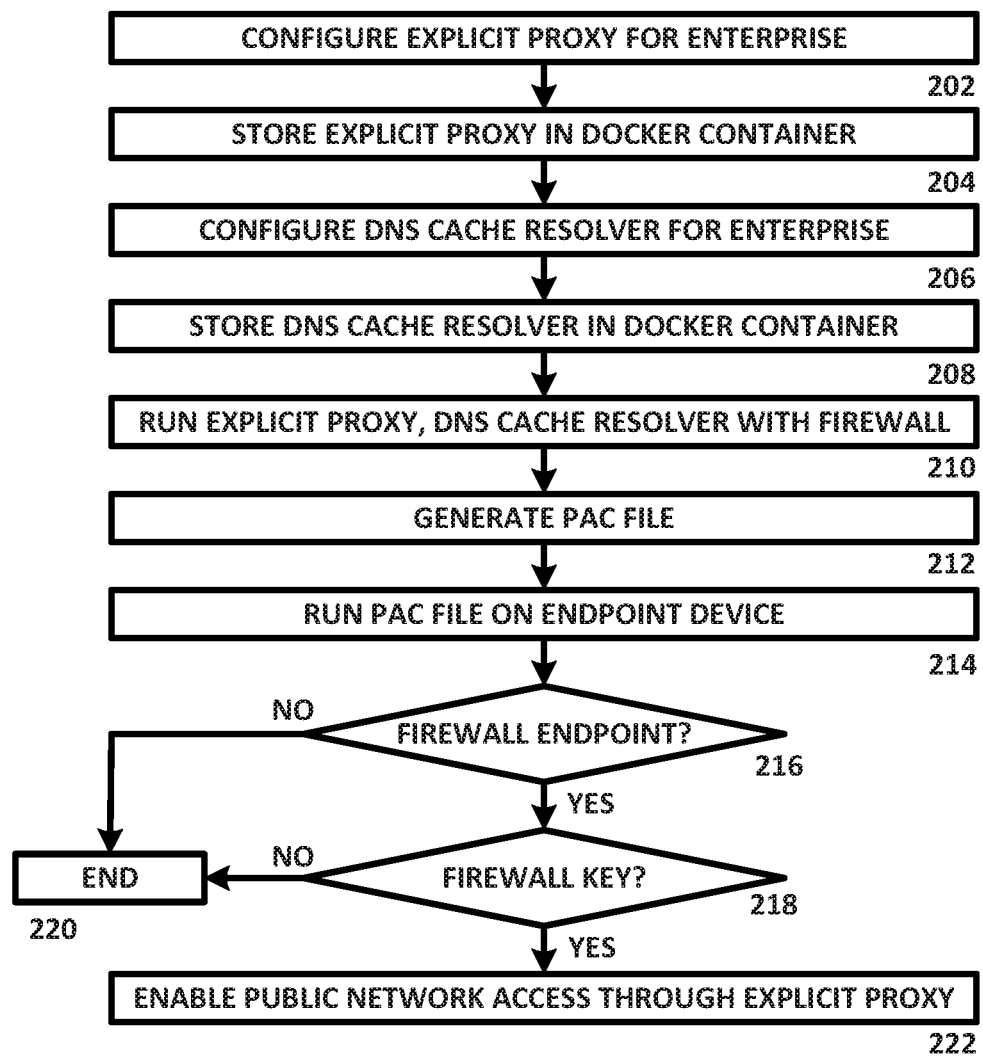
FIG. 2 is an algorithm for providing a cloud-based explicit proxy for firewall services, in accordance with an example embodiment of the present disclosure.

FIG. 2 is an algorithm 200 for providing a cloud-based explicit proxy for firewall services, in accordance with an example embodiment of the present disclosure. Algorithm 200 can be implemented in hardware or a suitable combination of hardware and software.

Algorithm 200 begins at 202, where an explicit proxy is configured for use with an enterprise network. In one example embodiment, the explicit proxy can be configured as discussed further herein, to provide support for enterprise services and policies in conjunction with an enterprise firewall, or in other suitable manners. The algorithm then proceeds to 204.

At 204, the explicit proxy is stored in a docker container. In one example embodiment, the explicit proxy can be stored in a docker container to facilitate distribution and installation of the explicit proxy in a cloud environment, such as part of instantiation of cloud computing instances or in other suitable manners as discussed further herein. The algorithm then proceeds to 206.

At 206, where a DNS cache resolver is configured for use with an enterprise network. In one example embodiment, the DNS cache resolver can be configured as discussed further herein, to provide support for enterprise services and policies in conjunction with an enterprise firewall, or in other suitable manners. The algorithm then proceeds to 208.

At 208, the DNS cache resolver is stored in a docker container. In one example embodiment, the DNS cache resolver can be stored in a docker container to facilitate distribution and installation of the explicit proxy in a cloud environment, such as part of instantiation of cloud computing instances or in other suitable manners as discussed further herein. The algorithm then proceeds to 210.

At 210, the explicit proxy and DNS cache resolver are run in conjunction with a firewall. In one example embodiment, the explicit proxy and DNS cache resolver can be instantiated when needed by an end point device, or in other suitable manners. The algorithm then proceeds to 212.

At 212, a PAC file is generated. In one example embodiment, the PAC file can be generated by a DEP PAC file service and a PAC file download URL can be made available using a DEP customer portal user interface, such as when a customer is "on boarded" onto the DEP service, as discussed further herein, or other suitable processes can also or alternatively be used. The algorithm then proceeds to 214.

At 214, the PAC file is run on the end point device. In one example embodiment, the PAC file can be downloaded to the end point device by executing the PAC file download URL or in other suitable manners. The algorithm then proceeds to 216.

At 216, it is determined whether the end point device is operating a local firewall coordination system, as discussed further herein. If it is determined that the end point device is not operating the local firewall coordination system, the algorithm proceeds to 220 and ends, such as by generating an error message that instructs the user of the end point device to restart the end point device with the local firewall coordination system. Otherwise the algorithm proceeds to 218.

At 218, it is determined whether a key associated with the local firewall coordination system is present. If it is determined that the key is not present, the algorithm proceeds to 220 and ends, otherwise the algorithm proceeds to 222.

At 222, enable public network access through explicit proxy. In one example embodiment, access to the public network can be restricted to traffic that is processed using the explicit proxy, or other suitable processes can also or alternatively be used.

In operation, algorithm 200 can be used to provide a cloud-based explicit proxy for firewall services. Although algorithm 200 is shown as a flow chart, one of skill in the art will recognize that the associated algorithmic functions can be implemented using object oriented programming, a ladder diagram, a state diagram, other suitable programming paradigms, a suitable combination of programming paradigms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising:
   a proxy server implemented on a cloud processing platform that is configured to instantiate the proxy server on demand using a container logic structure;
   a first processor configured to operate one or more algorithms to provide an explicit proxy that directs network communications over a public network to a proxy server;
   the first processor configured to operate one or more algorithms to provide a firewall agent that verifies the presence of a firewall key issued by a firewall system prior to allowing data communications over the public network using the explicit proxy;
   a user device that is configured to receive the firewall agent and to use the firewall agent to receive firewall services; and
   wherein the explicit proxy is installed using a proxy auto configuration file that is associated with the firewall agent.

2. The system of claim 1 wherein the proxy server is a firewall proxy server implemented on a cloud processing platform that instantiates the firewall proxy server on demand.

3. The system of claim 1 wherein the proxy server is implemented on a cloud processing platform that instantiates the proxy server and an associated firewall DNS cache resolver on demand.

4. The system of claim 1 wherein the cloud processing platform is configured to instantiate an associated DNS cache resolver on demand for a remote device prior to providing firewall services for the remote device using container logic structures.

5. The system of claim 1 wherein the cloud processing platform is configured to instantiate an associated DNS cache resolver on demand for the firewall system.

6. The system of claim 1 wherein verifying the presence of the firewall key comprises verifying the presence of a security key that is used by the firewall system to validate a user.

7. The system of claim 1 wherein the firewall agent operates remotely from a firewall system on a protected end point device and the firewall system uses the firewall agent to authenticate the protected end point device prior to providing firewall services to the end point device.

8. A method for processing data, comprising:
   implementing a proxy server on a cloud processing platform that is configured to instantiate the proxy server on demand to provide firewall services for an end point device in response to verification that a firewall key was received from the end point device;
   configuring a first processor at the end point device remote from a firewall system to operate one or more algorithms to provide an explicit proxy that directs network communications over a public network to the proxy server;
   configuring the first processor to operate one or more algorithms to provide a firewall agent that verifies the presence of the firewall key on the end point device that was issued by the firewall system prior to allowing data communications over the public network to the end point device using the explicit proxy; and
   installing the explicit proxy using a proxy auto configuration file that is associated with the firewall agent.

9. The method of claim 8 further comprising the cloud processing platform configured to instantiate an associated DNS cache resolver of the firewall system on demand in response to verification that the firewall key was received from the end point device.

10. The method of claim 8 further comprising the cloud processing platform configured to instantiate the proxy server on demand using a container logic structure of the firewall system in response to verification that the firewall key was received from the end point device.

11. The method of claim 8 further comprising the cloud processing platform configured to instantiate the proxy server and an associated DNS cache resolver on demand for the end point device using container logic structures in response to verification that the firewall key was received from the end point device.

12. The method of claim 8 further comprising the cloud processing platform configured to instantiate the proxy server and an associated DNS cache resolver on demand to provide firewall services for the end point device in conjunction with a firewall system operating on the cloud processing platform in response to verification that the firewall key was received from the end point device.

13. The method of claim 8 wherein verifying the presence of the firewall key comprises verifying the presence of a security key that is used by the firewall system to validate a user.

14. The method of claim 8 wherein the firewall agent operates remotely from a firewall system on a protected end point device and the firewall system uses the firewall agent to authenticate the protected end point device prior to providing firewall services to the end point device.

15. In a system for processing data that includes a first processor configured to operate one or more algorithms to provide an explicit proxy that directs network communications over a public network to a proxy server, the first processor configured to operate one or more algorithms to provide a firewall agent that verifies the presence of a firewall key prior to allowing data communications over the public network using the explicit proxy, wherein the explicit proxy is installed using a proxy auto configuration file that is associated with the firewall agent, wherein the proxy server is implemented on a cloud processing platform that instantiates the proxy server and an associated DNS cache resolver on demand using container logic structures or wherein the proxy server is implemented on a cloud processing platform that instantiates the proxy server and an associated DNS cache resolver on demand in conjunction with a firewall system operating on the cloud processing platform in response to interacting with the firewall agent at the processor from a remote device prior to providing firewall services to the remote device, a method comprising:
   configuring the first processor to operate the one or more algorithms to provide the explicit proxy that directs the network communications over the public network to the proxy server;
   configuring the first processor to operate the one or more algorithms to provide a firewall agent that verifies the presence of the firewall key issued by the firewall system prior to allowing data communications over the public network using the explicit proxy; and installing the explicit proxy using the proxy auto configuration file that is associated with the firewall agent.

16. The method of claim 15 further comprising implementing the proxy server on the cloud processing platform that instantiates the proxy server and the associated DNS cache resolver on demand for a remote device in response to interacting with the firewall agent at the remote device.

17. The method of claim 15 further comprising implementing the proxy server on the cloud processing platform that instantiates the proxy server on demand using the container logic structure in response to interacting with the firewall agent at the processor from an edge agent of the firewall system at a remote device.

18. The method of claim 15 further comprising implementing the proxy server on the cloud processing platform that instantiates the proxy server and the associated DNS cache resolver on demand for a remote device using the container logic structures in response to interacting with the firewall agent at the processor from an edge agent of the firewall system at the remote device.

19. The method of claim 15 further comprising implementing the proxy server on the cloud processing platform that instantiates the proxy server and the associated DNS cache resolver on demand in conjunction with the firewall system operating on the cloud processing platform in response to interacting with the firewall agent at the processor from a remote device prior to providing firewall services to the remote device.

20. The system of claim 15 wherein verifying the presence of the firewall key comprises verifying the presence of a security key that is used by the firewall system to validate a user.

* * * * *